US012812512B2

(12) United States Patent
Speicher et al.

(10) Patent No.: US 12,812,512 B2

(45) **Date of Patent: *Nov. 24, 2026**

(54) DISCOVERY AND SELECTION OF A STANDALONE NON-PUBLIC NETWORK (SNPN) BASED AT LEAST IN PART ON AN SNPN ROAMING GROUP

(71) Applicant: QUALCOMM Incorporated, San Diego, CA (US)

(72) Inventors: Sebastian Speicher, Wallisellen (CH); Haris Zisimopoulos, London (GB); Rajat Prakash, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 17/757,420

(22) PCT Filed: Dec. 8, 2020

(86) PCT No.: PCT/US2020/063798

§ 371 (c)(1),
(2) Date: Jun. 15, 2022

(87) PCT Pub. No.: WO2021/141707

PCT Pub. Date: Jul. 15, 2021

(65) Prior Publication Data

US 2023/0015696 A1 Jan. 19, 2023

(30) Foreign Application Priority Data

Jan. 7, 2020 (GR) .............................. 20200100006

(51) Int. Cl.
*H04W 36/00* (2009.01)
*H04W 8/02* (2009.01)
(Continued)

(52) U.S. Cl.
CPC ............. *H04W 48/12* (2013.01); *H04W 8/02* (2013.01); *H04W 8/186* (2013.01); *H04W 8/205* (2013.01); *H04W 84/045* (2013.01)

(58) Field of Classification Search
CPC ..... H04W 92/18; H04W 4/70; H04W 12/037; H04W 12/08; H04W 4/40; H04W 12/041;
(Continued)

(56) References Cited

U.S. PATENT DOCUMENTS

| | | | | |
|---|---|---|---|---|
| 9,332,480 B2 | 5/2016 | Griot et al. | | |
| 2005/0153691 A1* | 7/2005 | Xue | H04W 4/00 | 455/432.1 |

(Continued)

FOREIGN PATENT DOCUMENTS

| | | |
|---|---|---|
| CN | 104980993 A | 10/2015 |
| CN | 104995960 A | 10/2015 |

(Continued)

OTHER PUBLICATIONS

Qualcomm Incorporated., et al., "TS 23.501: Introducing Non-Public Network", 3GPP TSG-SA2 Meeting #131, S2-1902812, Santa Cruz—Tenerife, Spain, Feb. 25, 2019-Mar. 1, 2019, 11 Pages.

(Continued)

*Primary Examiner* — Quan M Hua

(74) *Attorney, Agent, or Firm* — HARRITY & HARRITY LLP

(57) ABSTRACT

Various aspects of the present disclosure generally relate to wireless communication. In some aspects, a user equipment (UE) may receive an indication of one or more SNPN roaming groups associated with a network to which the UE is subscribed. The UE may determine that a transmission from an SNPN identifies a roaming group identifier associated with an SNPN roaming group of the one or more SNPN roaming groups. The UE may register with the SNPN based
(Continued)

at least in part on determining that the transmission identifies the roaming group identifier. Numerous other aspects are provided.

29 Claims, 10 Drawing Sheets

(51) Int. Cl.

| | |
|---|---|
| ***H04W 8/18*** | (2009.01) |
| ***H04W 8/20*** | (2009.01) |
| ***H04W 48/12*** | (2009.01) |
| *H04W 84/04* | (2009.01) |

(58) Field of Classification Search

CPC ........... H04W 12/0433; H04W 12/106; H04W 72/56; H04W 76/27; H04W 80/02; H04W 80/08; H04W 16/28; H04W 4/06; H04W 52/365; H04W 52/40; H04W 72/0453; H04W 72/21; H04W 72/23; H04W 12/35; H04W 12/06; H04W 48/18; H04W 60/00; H04W 72/40; H04W 76/11; H04W 12/0431; H04W 4/46; H04W 48/02; H04W 28/0284; H04W 4/44; H04W 60/04; H04W 60/06; H04W 72/02; H04W 76/18; H04W 8/18; H04W 8/26; H04W 88/06; H04W 24/02; H04W 28/16; H04W 28/24; H04W 36/0038

See application file for complete search history.

(56) References Cited

U.S. PATENT DOCUMENTS

| | | | | |
|---|---|---|---|---|
| 2008/0020760 | A1* | 1/2008 | Elkarat | H04W 8/06 455/433 |
| 2010/0113020 | A1* | 5/2010 | Subramanian | H04W 48/18 455/435.2 |
| 2015/0333975 | A1* | 11/2015 | Sathyanath | H04L 41/5022 726/3 |
| 2017/0223623 | A1 | 8/2017 | Cao | |
| 2017/0353851 | A1* | 12/2017 | Gonzalez | H04M 15/8044 |
| 2019/0021051 | A1* | 1/2019 | Joseph | H04W 48/20 |
| 2019/0116486 | A1* | 4/2019 | Kim | H04W 8/10 |
| 2020/0221372 | A1* | 7/2020 | Shih | H04W 76/25 |
| 2021/0058784 | A1* | 2/2021 | Kedalagudde | H04W 76/12 |
| 2021/0297937 | A1* | 9/2021 | Baek | H04W 48/12 |
| 2021/0385700 | A1* | 12/2021 | Fu | H04W 36/0061 |
| 2023/0209327 | A1* | 6/2023 | Speicher | H04W 8/12 370/329 |

FOREIGN PATENT DOCUMENTS

| | | | | |
|---|---|---|---|---|
| CN | 108574985 A | | 9/2018 | |
| CN | 112584445 A | * | 3/2021 | H04W 36/0083 |
| WO | 2015148955 A1 | | 10/2015 | |

OTHER PUBLICATIONS

Qualcomm Incorporated: "Solution for SNPN Access Using 3rd Party Credentials", 3GPP TSG-SA WG2 Meeting #136, S2-1911364, Reno, USA, Nov. 18-22, 2019, pp. 1-6.

3GPP TR 23.700-07: "3rd Generation Partnership Project; Technical Specification Group Services and System Aspects; Study on enhanced support of Non-Public Networks (Release 17)", V0.2.0, Dec. 4, 2019, pp. 1-15.

3GPP TS 23.122: "3rd Generation Partnership Project; Technical Specification Group Core Network and Terminals; Non-Access-Stratum (NAS) functions related to Mobile Station (MS) in idle mode (Release 16)", V16.4.0, Dec. 19, 2019, pp. 1-80.

3rd Generation Partnership Project, Technical Specification Group Core Network and Terminals, Non-Access-Stratum (NAS) functions related to Mobile Station (MS) in idle mode (Release 16), 3GPP Standard; Technical Specification; 3GPP TS 23.122, 3rd Generation Partnership Project (3GPP), Mobile Competence Centre, 650, Route Des Lucioles, F-06921, Sophia-Antipolis Cedex, France, vol. CT WG1, No. V16.4.0, Dec. 19, 2019 (Dec. 19, 2019), pp. 1-80, XP051840753, Retrieved from the Internet: URL: http://ftp.3gpp.org/Specs/archive/23_series/23.122/23122-940.zip 23122-g40.doc [retrieved on Dec. 19, 2019], Paragraph "4.4.3.1.1 Automatic Network Selection Mode Procedure."

3rd Generation Partnership Project; Technical Specification Group Services and System Aspects; Study on enhanced support of Non-Public Networks (Release 17), 3GPP Standard; Technical Report; 3GPP TR 23.700-07, 3rd Generation Partnership Project (3GPP), Mobile Competence Centre, 650, Route Des Lucioles, F-06921, Sophia-Antipolis Cedex, France, No. V0.2.0, Dec. 4, 2019 (Dec. 4, 2019), pp. 1-15, XP051840694, Retrieved from the Internet: URL: http://ftp.3gpp.org/Specs/archive/23_series/23.700-07/23700-07-020.zip 23700-07-020_rm.docx [retrieved on Dec. 4, 2019], Paragraph "6.1 Solution #1: Standalone non-public network supporting service providers."

International Search Report and Written Opinion—PCT/US2020/063798—ISA/EPO—Apr. 1, 2021.

* cited by examiner

500

DISCOVERY AND SELECTION OF A STANDALONE NON-PUBLIC NETWORK (SNPN) BASED AT LEAST IN PART ON AN SNPN ROAMING GROUP

CROSS-REFERENCE TO RELATED APPLICATIONS

This Patent Application is a 371 national stage of PCT Application No. PCT/US2020/063798 filed on Dec. 8, 2020, entitled "DISCOVERY AND SELECTION OF A STANDALONE NON-PUBLIC NETWORK (SNPN) BASED AT LEAST IN PART ON AN SNPN ROAMING GROUP," which claims priority to Greece Patent Application Serial No. 20200100006, filed on Jan. 7, 2020, entitled "DISCOVERY AND SELECTION OF A STANDALONE NON-PUBLIC NETWORK (SNPN) BASED AT LEAST IN PART ON AN SNPN ROAMING GROUP. The disclosure of the prior Applications are considered part of and are incorporated by reference into this Patent Application as if fully set forth below in their entirety and for all applicable purposes.

TECHNICAL FIELD

Aspects of the technology described below generally relate to wireless communication and to techniques and apparatuses for discovery and selection of a standalone non-public network (SNPN) based at least in part on an SNPN roaming group. Some techniques and apparatuses described herein enable and provide wireless communication devices and systems configured for enhanced network coverage, enhanced scalability, and enhanced roaming capabilities.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a new radio (NR) BS, a 5G Node B, and/or the like.

Multiple access technologies have been adopted in various telecommunication standards. Wireless communication standards provide common protocols to enable different devices (e.g., user equipment) to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented later.

As the quantity of visited standalone non-public networks (V-SNPNs) and the quantity of supported home service providers (SPs) continue to grow, the relationships between V-SNPNs and home SPs may result in scaling issues. For example, a V-SNPN may need to maintain and update a growing and/or ever-changing list of support home SPs, which may consume large amounts of processing and memory resources for the various devices and/or components included in the V-SNPN. Moreover, as the V-SNPN supports a greater quantity of home SPs, the quantity of home SP identifiers that the V-SNPN broadcasts or transmits also grows, which may result in too much information being transmitted in system information of the V-SNPN and/or may result in increased radio resource consumption. Some aspects described herein provide techniques and apparatus for discovery and selection of an SNPN based at least in part on an SNPN roaming group. In some aspects, the SNPN roaming group may be introduced to reduce the complexity and increase the scalability of maintaining lists of supported home SPs for an SNPN (e.g., a V-SNPN). Moreover, in some aspects, an SNPN roaming hub may be introduced to reduce the processing and memory resource consumption of devices and/or components included in V-SNPNs that would otherwise be consumed on maintaining lists of supported home SPs.

In some aspects, a method of wireless communication, performed by a user equipment (UE), may include receiving an indication of one or more SNPN roaming groups associated with a network to which the UE is subscribed; determining that a transmission from an SNPN identifies a roaming group identifier associated with an SNPN roaming group of the one or more SNPN roaming groups; and registering with the SNPN based at least in part on determining that the transmission identifies the roaming group identifier.

In some aspects, a UE for wireless communication may include memory and one or more processors operatively coupled to the memory. The memory and the one or more processors may be configured to receive an indication of one or more SNPN roaming groups associated with a network to which the UE is subscribed; determine that a transmission from an SNPN identifies a roaming group identifier associated with an SNPN roaming group of the one or more SNPN roaming groups; and register with the SNPN based at least in part on determining that the transmission identifies the roaming group identifier.

In some aspects, a non-transitory computer-readable medium may store one or more instructions for wireless communication. The one or more instructions, when executed by one or more processors of a UE, may cause the one or more processors to receive an indication of one or more SNPN roaming groups associated with a network to which the UE is subscribed; determine that a transmission from an SNPN identifies a roaming group identifier associated with an SNPN roaming group of the one or more SNPN roaming groups; and register with the SNPN based at least in part on determining that the transmission identifies the roaming group identifier.

In some aspects, an apparatus for wireless communication may include means for receiving an indication of one or more SNPN roaming groups associated with a network to which the UE is subscribed; means for determining that a transmission from an SNPN identifies a roaming group identifier associated with an SNPN roaming group of the one or more SNPN roaming groups; and means for registering with the SNPN based at least in part on determining that the transmission identifies the roaming group identifier.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
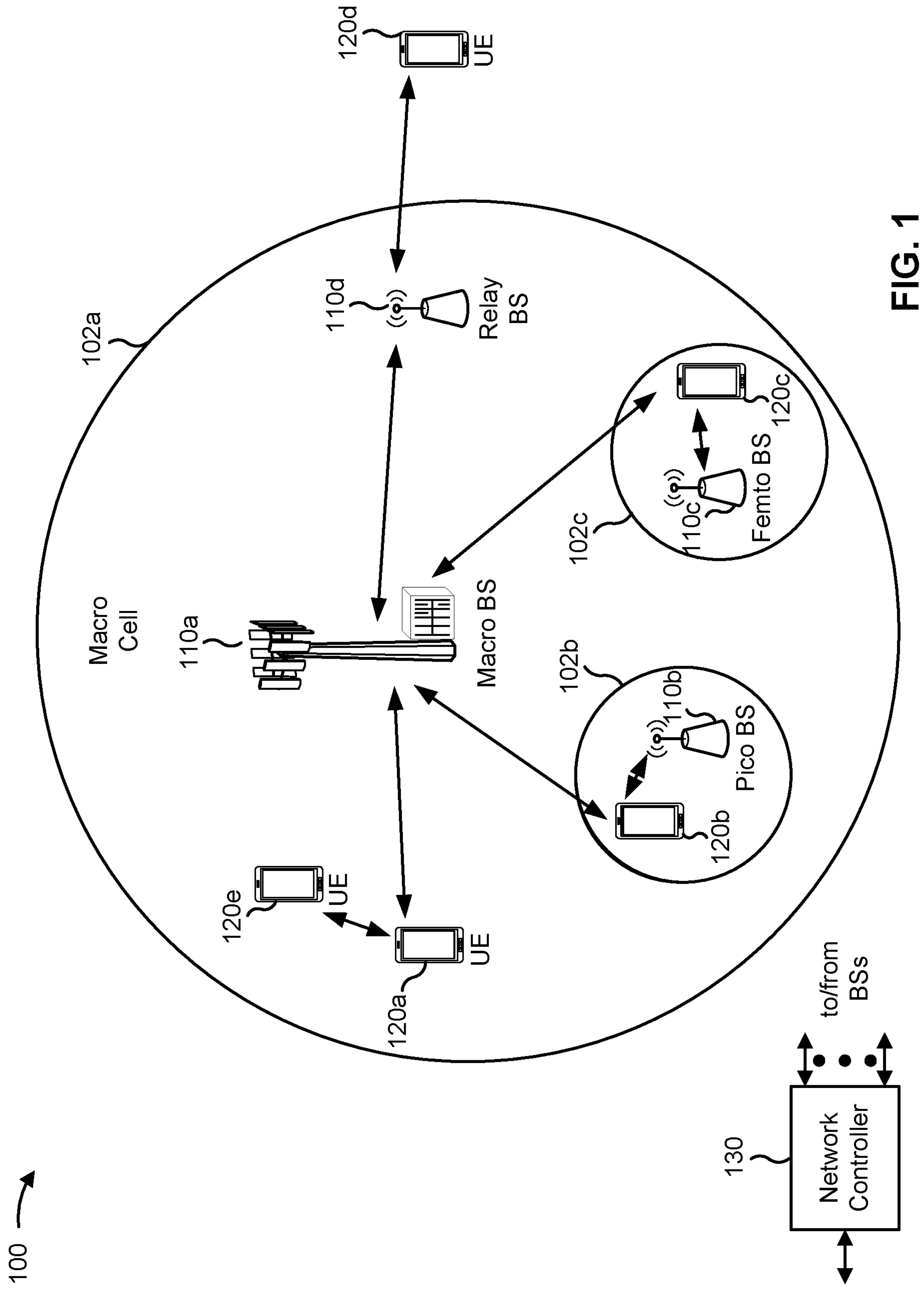
FIG. 1 is a diagram illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, artificial intelligence-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, radio frequency (RF)-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular area (e.g., a fixed or changing geographical area). In some scenarios, BSs 110 may be stationary or non-stationary. In some non-stationary scenarios, mobile BSs 110 may move with varying speeds, direction, and/or heights. In 3GPP, the term "cell" can refer to a coverage area of a BS 110 and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. Additionally, or alternatively, a BS may support access to an unlicensed RF band (e.g., a Wi-Fi band and/or the like). A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network. In other scenarios, BSs may be implemented in a software defined network (SDN) manner or via network function virtualization (NFV) manner.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like. These components may be integrated in a variety of combinations and/or may be stand-alone, distributed components considering design constraints and/or operational preferences.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. A UE performing scheduling operations can include or perform base-station-like functions in these deployment scenarios.

As indicated above, FIG. 1 is provided merely as an example. Other examples may differ from what is described with regard to FIG. 1.

Figure 2:
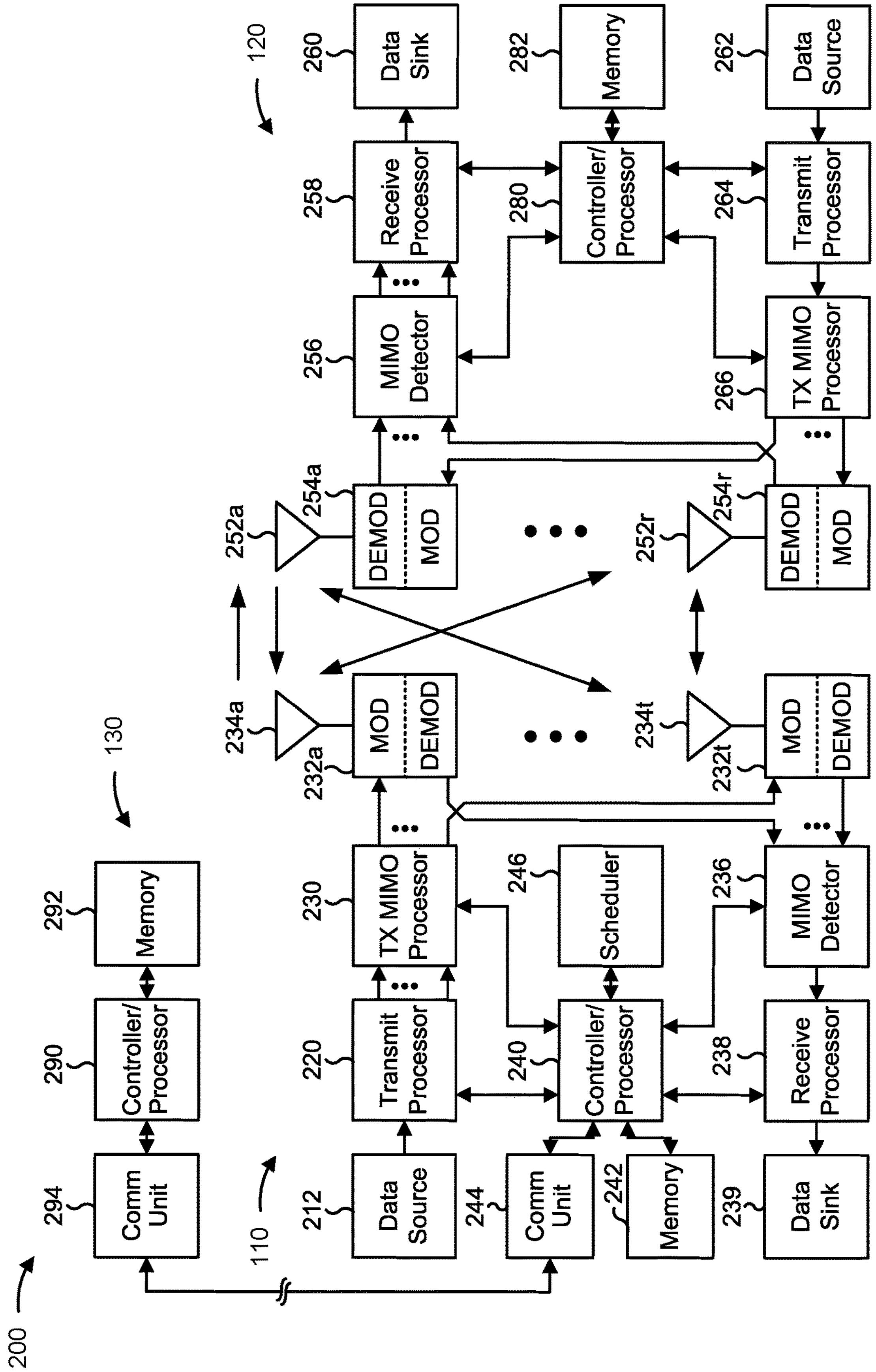
FIG. 2 is a diagram illustrating an example of a base station in communication with a user equipment (UE) in a wireless communication network, in accordance with various aspects of the present disclosure.

FIG. 2 is a diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$. The T and R antennas may be configured with multiple antenna elements formed in an array for MIMO or massive MIMO deployments that can occur in millimeter wave (mmWave or mmW) communication systems.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive downlink RF signals. The downlink RF signals may be received from and/or may be transmitted by one or more base stations 110. The signals can be provided to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

For uplink communications, a UE 120 may transmit control information and/or data to another device, such as one or more base stations 110. For example, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with discovery and selection of a standalone non-public network (SNPN) based at least in part on an SNPN roaming group, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include a variety of means or components for implementing communication functions. For example, the variety of means may include means for receiving an indication of one or more SNPN roaming groups associated with a network to which the UE is subscribed, means for determining that a transmission from an SNPN identifies a roaming group identifier associated with an SNPN roaming group of the one or more SNPN roaming groups, means for registering with the SNPN based at least in part on determining that the transmission identifies the roaming group identifier, and/or the like.

In some aspects, the UE 120 may include a variety of structural components for carrying out functions of the various means. For example, structural components that carry out functions of such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, the base station 110 may include a variety of structural components for carrying out functions of the various means. For example, structural components that carry out functions of such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2.

Figure 3:
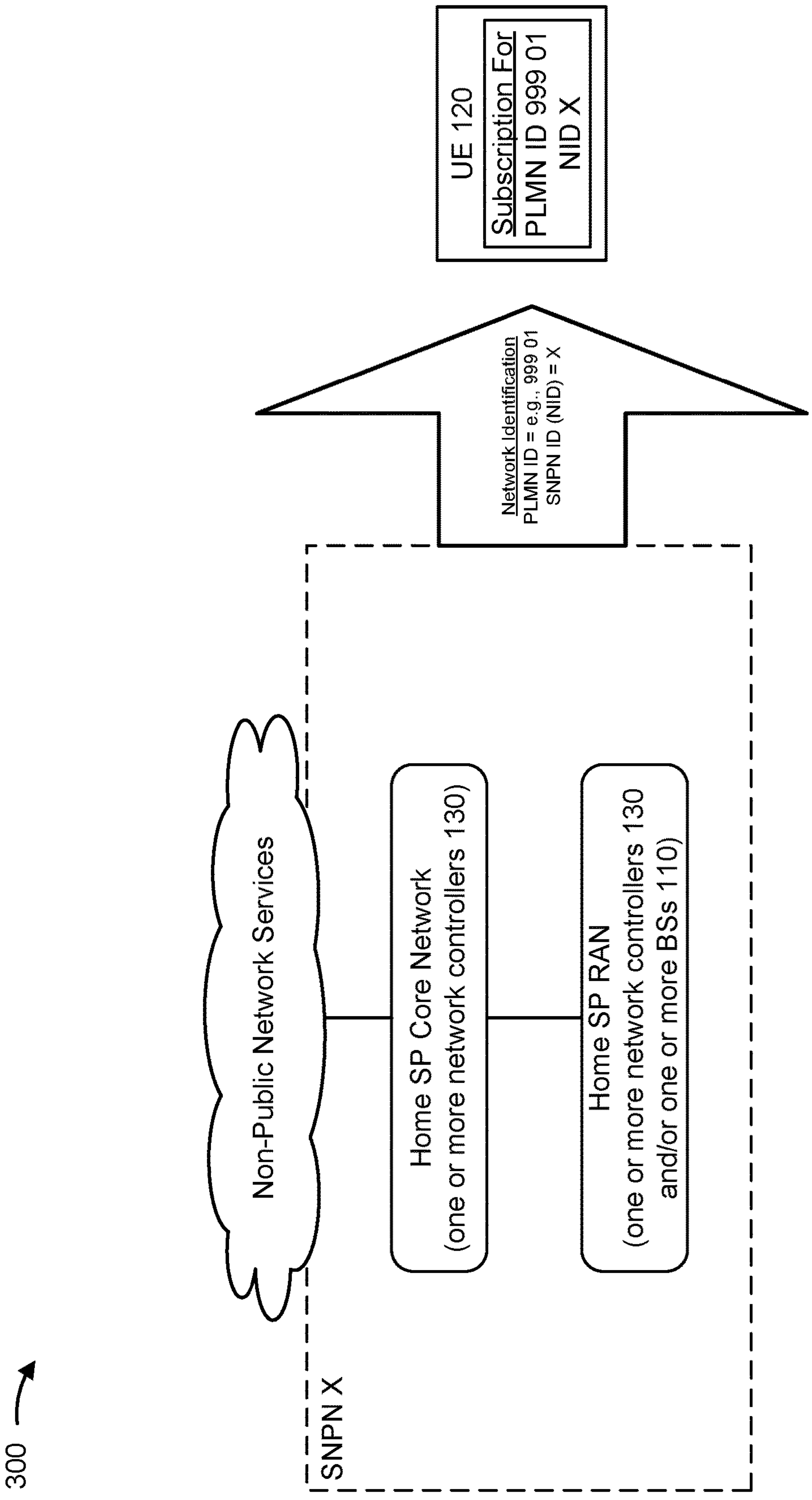
FIG. 3 is a diagram illustrating an example of a standalone non-public network (SNPN), in accordance with various aspects of the present disclosure.

FIG. 3 is a diagram illustrating an example 300 of an SNPN, in accordance with various aspects of the present disclosure. An SNPN is a dedicated, private wireless network (e.g., a 5G network or another type of wireless network) that may be associated with an enterprise, a facility, or another entity or site. For example, an SNPN may be associated with a particular corporate campus, a particular factory, a particular industrial facility, and/or the like.

As shown in FIG. 3, an SNPN (e.g., referred to as SNPN X in FIG. 3) may be implemented in and by a wireless network, which may be referred to as a home service provider (home SP) wireless network for a UE (e.g., a UE 120). In this case, a core network and a radio access network (RAN) of the home SP may be configured to provide the SNPN to the UE and/or other UEs that are permitted to access the SNPN.

The core network may include one or more network controllers 130 that provide various core network functions, such as a Network Slice Selection Function (NSSF), a Network Exposure Function (NEF), an Authentication Server Function (AUSF), a Unified Data Management (UDM) function, a Policy Control Function (PCF), an Application Function (AF), an Access and Mobility Management Function (AMF), a Session Management Function (SMF), a User Plane Function (UPF), an Inter-Working Function (IWF), and/or the like. The RAN may include one or more network controllers 130 and/or one or more BSs 110 that provide wireless coverage to UEs that access the home SP.

In some cases, access to the SNPN may be limited to UEs having subscriptions to the SNPN. In this case, a UE may be provisioned and/or otherwise configured with subscription information associated with the SNPN so that the UE can use the subscription information to register with the SNPN. As shown in FIG. 3, the subscription information may include a public land mobile network (PLMN) identifier associated with the home SP and an SNPN identifier (e.g., which may be referred to as a network identifier (NID)) associated with the SNPN. In some cases, the SNPN (e.g., one or more BSs 110 in the SNPN) may configure the UE with the subscription information as part of a subscriber identity module (SIM) over-the-air (OTA) update procedure, a UE parameters update (UPU) procedure via a UDM control plane procedure, a steering of roaming (SoR) procedure, and/or another type of provisioning procedure. The UE may receive the subscription information and may store the subscription information in a SIM component, a universal integrated circuit card (UICC) component, and/or another component configured to store subscription information. In some cases, the UE may be deployed with a SIM component or UICC component that is already configured with the subscription information.

To access the SNPN, the UE may scan or monitor for transmissions that identify the PLMN identifier and the NID of the SNPN. For example, the SNPN (e.g., one or more BSs 110 in the SNPN) may broadcast and/or otherwise transmit the PLMN identifier and the NID of the SNPN to that UEs may discover the SNPN. The UE may determine whether the PLMN identifier and the NID identified in the broadcast or transmission from the SNPN matches the PLMN identifier and the NID in the subscription information stored by the UE. If the PLMN identifier and the NID match, the UE may attempt to register with the SNPN. Once the UE has registered with the SNPN, the SNPN may grant the UE access to various non-public network services hosted by the SNPN.

As indicated above, FIG. 3 is provided as an example. Other examples may differ from what is described with respect to FIG. 3.

Figure 4A:
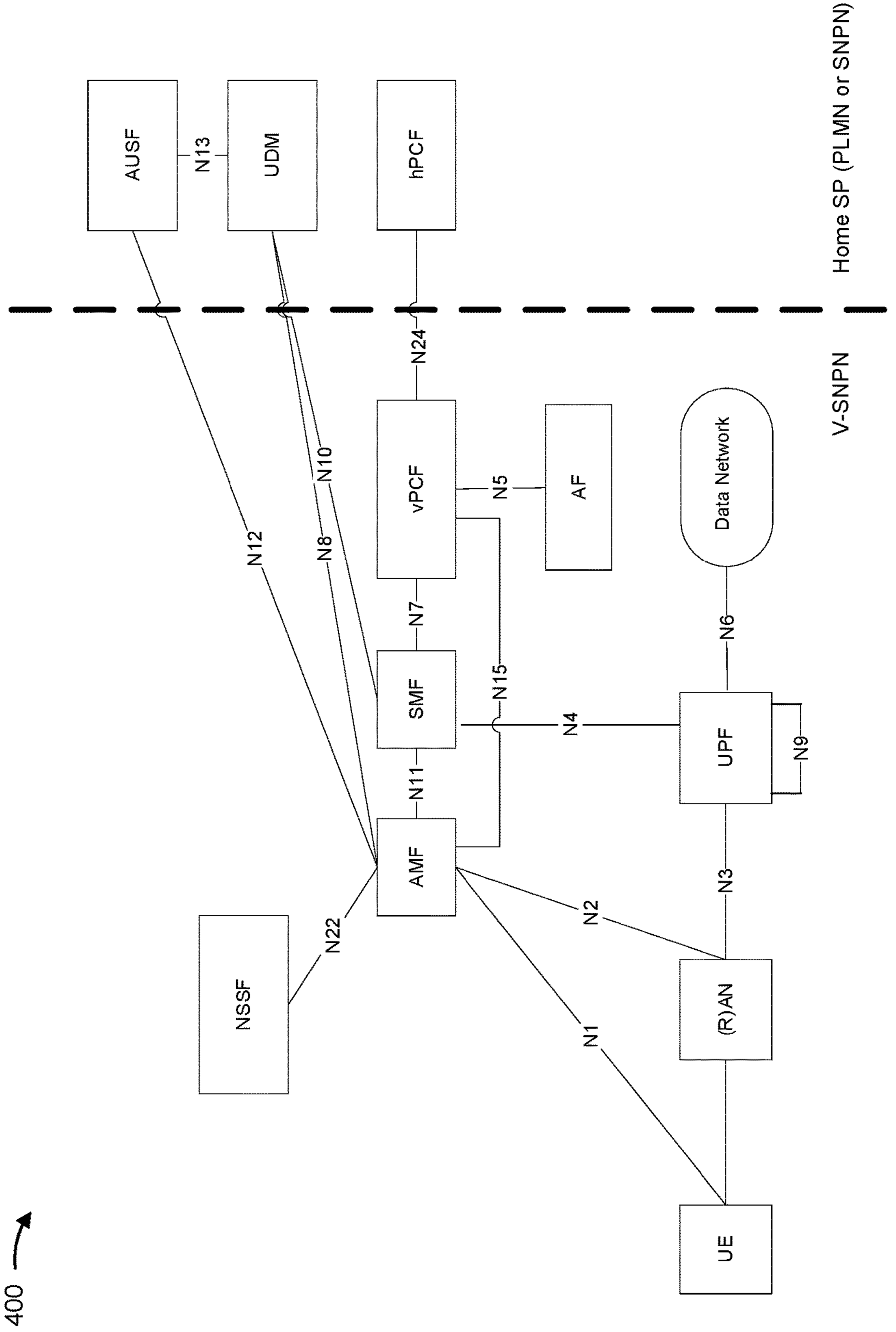
FIGS. 4A-4C are diagrams illustrating examples of SNPN access, in accordance with various aspects of the present disclosure.
Figure 4B:
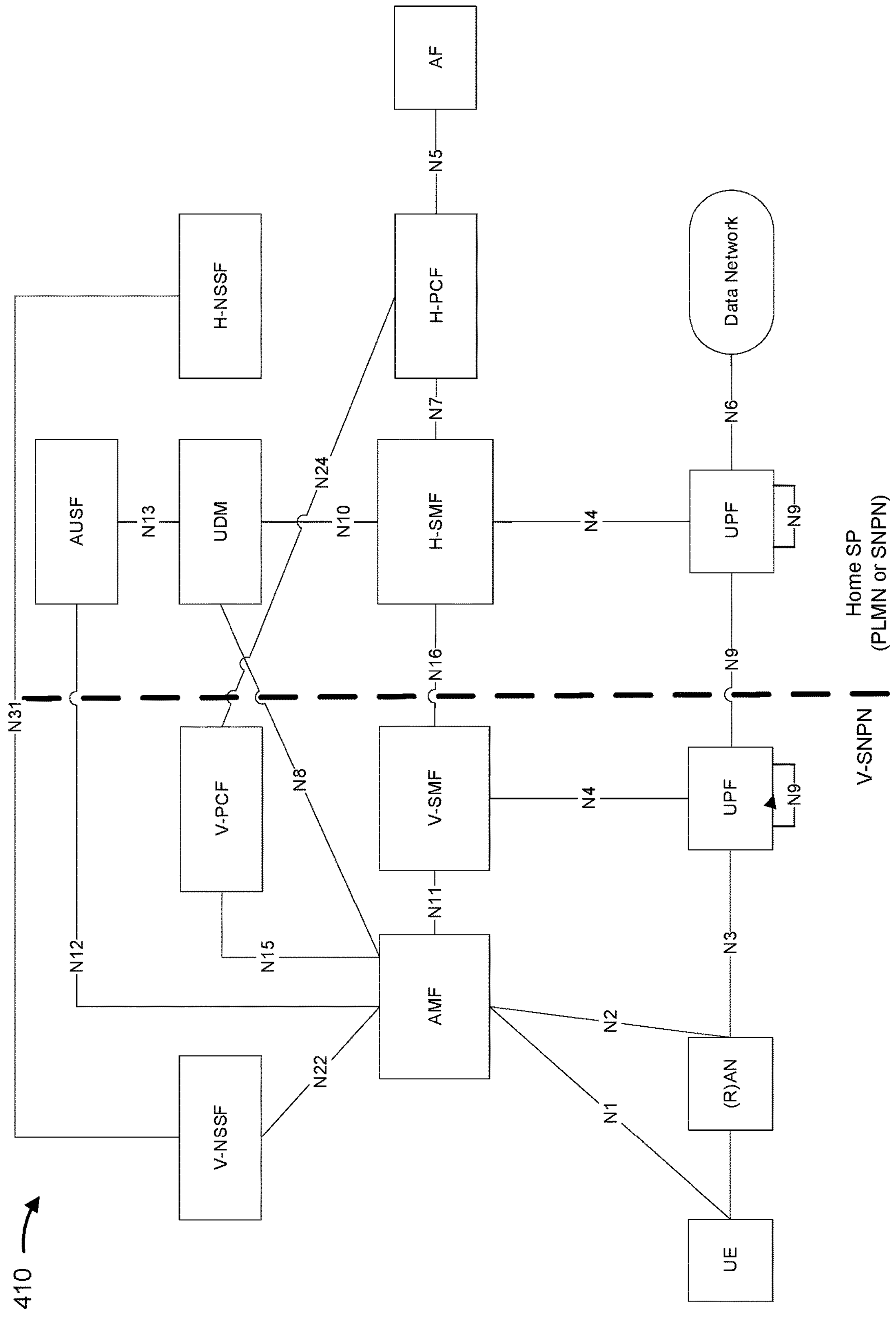
Figure 4C:
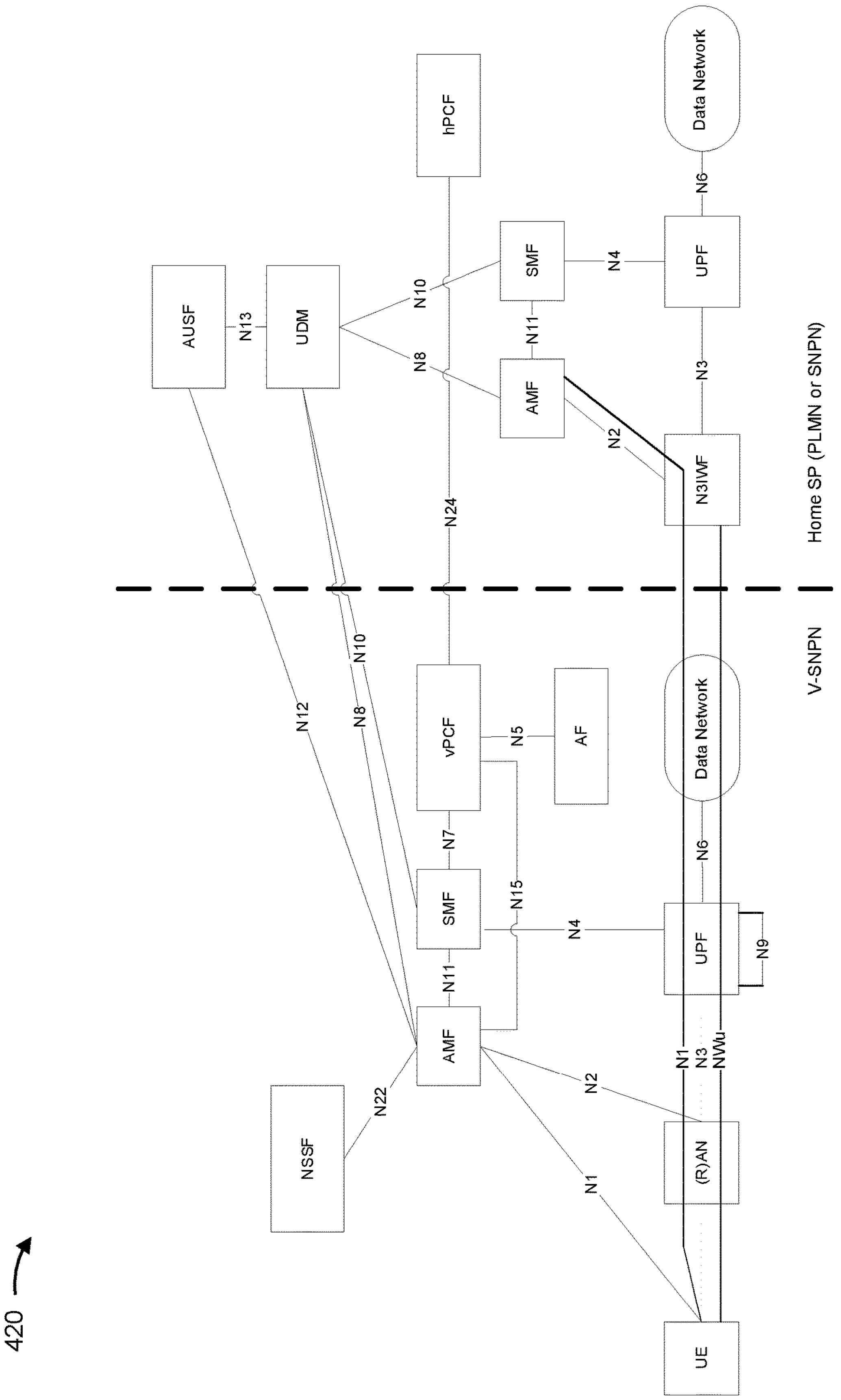

FIGS. 4A-4C are diagrams illustrating examples 400, 410, and 420 of SNPN access, in accordance with various aspects of the present disclosure. In particular, FIGS. 4A-4C show communications between components (e.g., implementing various network functions) of a subscribed wireless network (e.g., a home SP) and an SNPN in connection with a registration procedure of a UE (e.g., UE 120). Accordingly, as part of the registration procedure of the UE, the SNPN (e.g., one or more devices and/or components implementing the SNPN) may establish a connection to the subscribed wireless network (e.g., one or more devices and/or components implementing the subscribed wireless network). For example, based at least in part on an identifier provided by the UE as part of a registration procedure (e.g., a subscription permanent identifier (SUPI), a subscription concealed identifier (SUCI), and/or the like), a device implementing one or more components of the SNPN may determine an identity of the subscribed wireless network, and accordingly, may determine an address (e.g., using a mapping) at which the subscribed wireless network is reachable.

As shown in FIG. 4A, the SNPN may communicate with the subscribed wireless network to perform authentication of the UE and obtain subscription information for the UE. In particular, an AMF of the SNPN may communicate with an AUSF of the subscribed wireless network to authenticate the UE. For example, the AMF may transmit credentials of the UE that were provided with a registration request of the UE. In addition, the AMF and an SMF of the SNPN may communicate with a UDM function of the subscribed wireless network to obtain subscription information for the UE. For example, the AMF and/or the SMF may transmit an identifier of the UE (e.g., a SUPI or a SUCI) that was provided with a registration request of the UE. As shown in FIG. 4A, after registration, the UE may communicate with a data network (e.g., a data network providing non-public network services, and/or the like) via a UPF of the SNPN.

As shown in FIG. 4B, the SNPN may communicate with the subscribed wireless network to perform authentication of the UE and obtain subscription information for the UE, as described above. In particular, an AMF of the SNPN may communicate with an AUSF of the subscribed wireless network to authenticate the UE, as described above. In addition, the AMF may communicate with a UDM component of the subscribed wireless network to obtain subscription information for the UE, as described above. As shown in FIG. 4B, after registration, the UE may communicate with a data network (e.g., the Internet) via the subscribed wireless network. For example, a UPF of the SNPN may forward a session (e.g., a physical data unit (PDU) session) of the UE to a UPF of the subscribed wireless network for termination at the data network via the subscribed wireless network.

As shown in FIG. 4C, the SNPN may communicate with the subscribed wireless network to perform authentication of the UE and obtain subscription information for the UE, as described above. In particular, an AMF of the SNPN may communicate with an AUSF of the subscribed wireless network to authenticate the UE, as described above. In addition, the AMF and an SMF of the SNPN may communicate with a UDM component of the subscribed wireless network to obtain subscription information for the UE, as described above. As shown in FIG. 4C, after registration, the UE may communicate with a data network (e.g., the Internet) via a UPF of the SNPN. As further shown in FIG. 4C, the UE may establish a tunnel, via the data network, to an inter-working function (IWF) of the subscribed wireless network, thereby enabling the UE to access a data network (e.g., for file retrieval) via the UPF of the subscribed wireless network.

As indicated above, FIGS. 4A-4C are provided as examples. Other examples may differ from what is described with respect to FIGS. 4A-4C.

In some cases, a UE (e.g., a UE 120) may be capable of accessing an SNPN implemented by and/or hosted in a wireless network using a subscription for another wireless network. This may be referred to as SNPN roaming. In this case, the SNPN may be referred to as a visited SNPN (V-SNPN). A V-SNPN may broadcast and/or otherwise transmit the identifiers (e.g., PLMN identifiers and/or other types of identifiers) of the wireless networks (e.g., the home SPs) that the V-SNPN supports (e.g., to which the V-SNPN has a roaming agreement). A UE may receive a broadcast or transmission from the V-SNPN (e.g., in a system information block (SIB) or another type of system information transmission) and may determine whether the UE has a subscription to any of the PLMN identifiers identified in the broadcast or transmission. If the UE determines that the UE is subscribed to a PLMN identifier, the UE may register with the V-SNPN.

As the quantity of V-SNPNs and the quantity of supported home SPs continue to grow, the relationships between V-SNPNs and home SPs may result in scaling issues. For example, a V-SNPN may need to maintain and update a growing and/or ever-changing list of support home SPs, which may consume large amounts of processing and memory resources for the various devices and/or components included in the V-SNPN. Moreover, as the V-SNPN supports a greater quantity of home SPs, the quantity of home SP identifiers that the V-SNPN broadcasts or transmits also grows, which may result in too much information in the SIB(s) of the V-SNPN and/or may result in increased radio resource consumption.

Some aspects described herein provide techniques and apparatus for discovery and selection of an SNPN based at least in part on an SNPN roaming group. In some aspects, the SNPN roaming group may be introduced to reduce the complexity and increase the scalability of maintaining lists of supported home SPs for an SNPN (e.g., a V-SNPN). An SNPN roaming group may be identified by a roaming group identifier (RGID), which may also be referred to as a group identifier (GID) or a home SP group identifier (Home SP Group ID). An SNPN may be configured to include a plurality of networks (e.g., home SPs). In this way, an SNPN may broadcast or transmit the RGID to indicate the plurality of networks, which consumes fewer radio resources than explicitly broadcasting or transmitting the individual identifiers for each of the plurality of networks.

Moreover, in some aspects, an SNPN roaming hub (e.g., implemented by a network controller 130) may be introduced to reduce the processing and memory resource consumption of devices and/or components included in V-SNPNs that would otherwise be consumed to maintain lists of supported home SPs. The SNPN roaming hub may configure an RGID for one or more V-SNPNs, and each V-SNPN may broadcast or transmit the RGID. Moreover, the SNPN roaming hub may offload the burden of keeping lists of supported home SPs up to date by updating the RGID as home SPs are added and/or removed from the SNPN roaming group associated with the RGID.

Figure 5A:
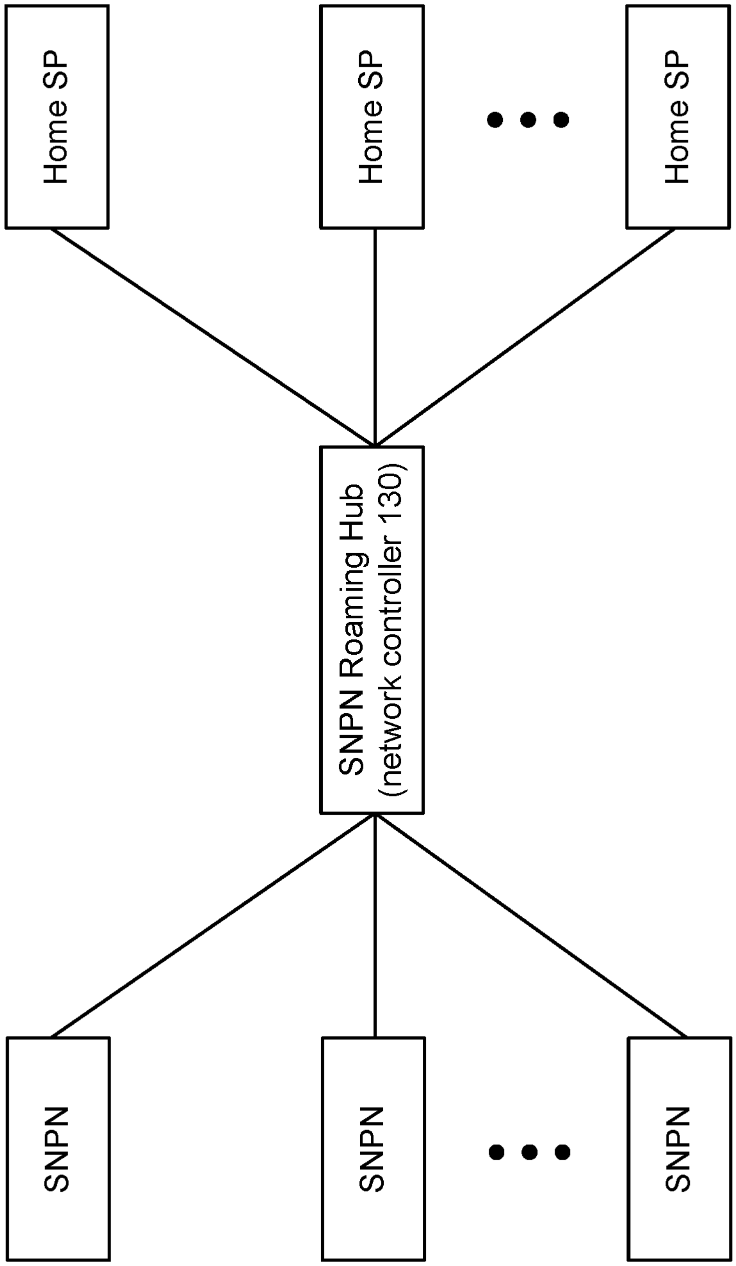
FIGS. 5A and 5B are diagrams illustrating one or more examples of discovery and selection of an SNPN based at least in part on an SNPN roaming group, in accordance with various aspects of the present disclosure.
Figure 5B:
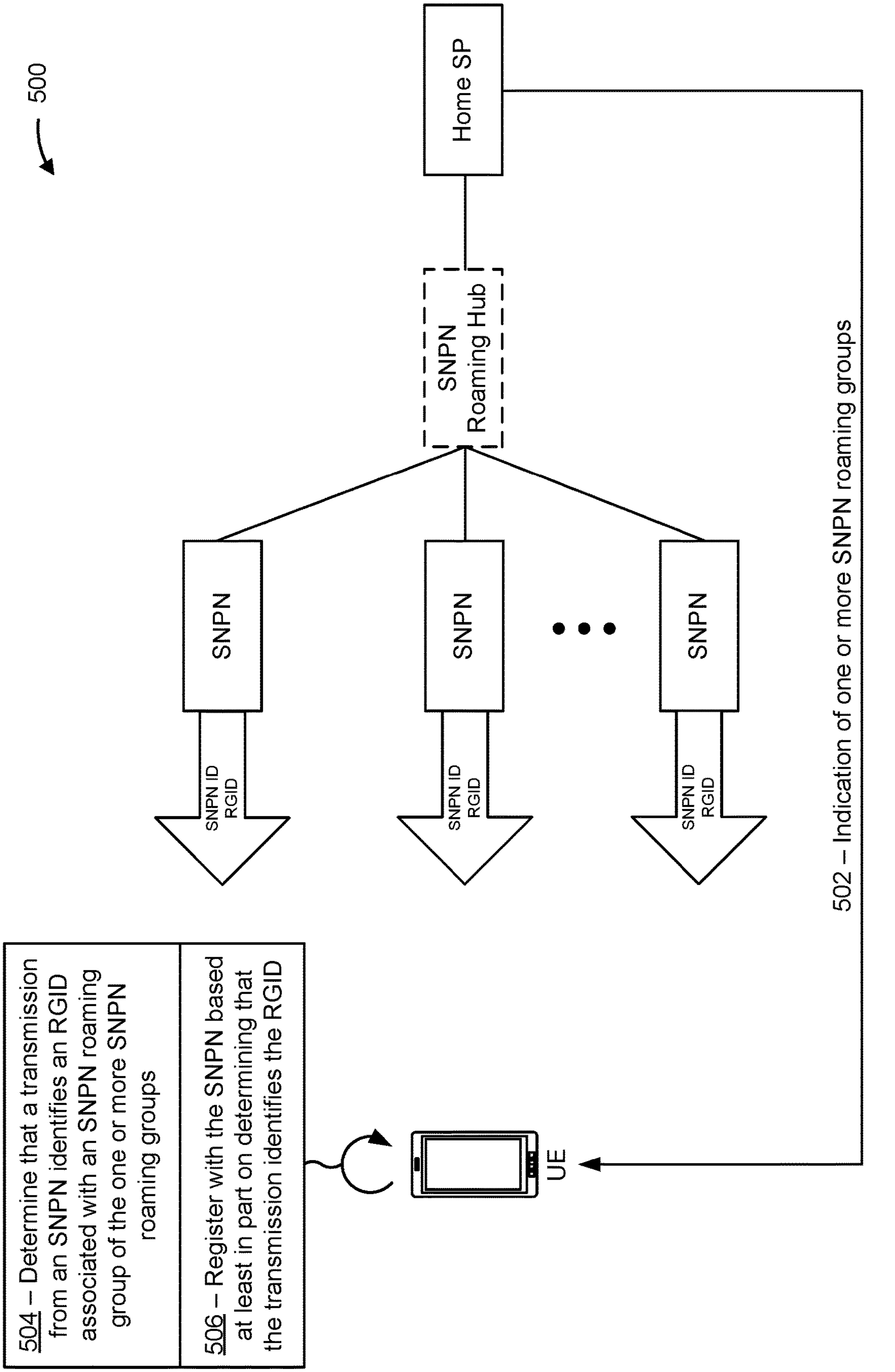

FIGS. 5A and 5B are diagrams illustrating an example(s) 500 of discovery and selection of an SNPN based at least in part on an SNPN roaming group, in accordance with various aspects of the present disclosure. As shown in FIGS. 5A and 5B, example(s) 500 may include one or more SNPNs (e.g., V-SNPNs), one or more home SPs (e.g., wireless networks 100), an SNPN roaming hub (e.g., a network controller 130), and/or a UE (e.g., a UE 120).

As shown in FIG. 5A, the SNPN roaming hub may function as a communication intermediary between the SNPNs and the home SPs. The SNPN roaming hub may be responsible for generating, configuring, and updating SNPN roaming groups and associated RGIDs for the SNPNs and the home SPs, may be responsible for providing indications of the SNPN roaming groups and associated RGIDs to the SNPNs and the home SPs, may be responsible for providing updated SNPN roaming groups and associated RGIDs to the SNPNs and the home SPs, and/or the like. In some aspects, the SNPN roaming hub may be omitted from example(s) 500, in which case the SNPNs and home SPs may jointly generate, configure, and update the SNPN roaming groups and associated RGIDs.

In some aspects, the SNPN roaming hub may generate and/or configure an SNPN roaming group to include a plurality of home SPs. In some aspects, an SNPN roaming group may be subscription based or roaming agreement based. For example, the SNPN roaming hub may generate and/or configure an SNPN roaming group for an SNPN, where the SNPN has a roaming agreement with the home SPs included in the SNPN roaming group. In this case, UEs that are subscribed to the SNPN and any of the home SPs may access the SNPN from the home SP to which the UE is subscribed and via a different home SP in which the SNPN is provided (e.g., through the use of the roaming agreement).

As shown in FIG. 5B, a UE may discover and register with an SNPN (e.g., a V-SNPN) based at least in part on an SNPN roaming group associated with the SNPN. As shown by reference number 502, the home SP to which the UE is subscribed (e.g., a BS 110 in the home SP of the UE) may transmit an indication of one or more SNPN roaming groups to the UE. The home SP of the UE may be associated with and/or included in each of the SNPN roaming groups. Each of the SNPN roaming groups may include one or more other home SPs (e.g., other wireless networks 100). In this case, the home SP of the UE and the other home SPs associated with an SNPN roaming group may have a roaming agreement that permits UEs to access supported SNPNs via roaming on a home SP to which the UE is not subscribed. The UE may be permitted to access an SNPN that broadcasts or transmits an RGID associated with an SNPN roaming group via a roaming agreement between the home SP of the UE and another home SP included in the SNPN roaming group.

In some aspects, the one or more SNPN roaming groups may be generated or configured by the SNPN roaming hub, if included, which may transmit an indication of the one or more SNPN roaming groups to the home SP. Moreover, the SNPN roaming hub may transmit, to each SNPN, an indication the SNPN roaming group(s) supported by the SNPN so that the SNPN can broadcast the RGID(s) of the SNPN roaming group(s) along with the SNPN identifier (e.g., NID) of the SNPN. In this way, UEs can discover and register with SNPN.

In some aspects, the home SP may transmit the indication of the one or more SNPN roaming groups to the UE in system information (e.g., a SIB, a master information block (MIB), remaining minimum system information (RMSI), other system information (OSI), in downlink signaling (e.g., in a radio resource control (RRC) communication, in a medium access control control element (MAC-CE) communication, in a downlink control information (DCI) communication, and/or the like.

In some aspects, the UE may receive the indication of the one or more SNPN roaming groups as part of a SIM OTA update procedure, as part of a UE configuration update procedure, and/or the like. The UE may store information identifying the one or more SNPN roaming groups in a SIM component or UICC component of the UE (e.g., along with subscription information for the UE). Additionally and/or alternatively to receiving the indication of the one or more SNPN roaming groups, the UE may be provisioned and/or deployed with a SIM or UICC configuration that already includes the information identifying the one or more SNPN roaming groups. In this case, updates to the SNPN roaming groups may be provided to the UE via a SIM OTA update procedure or a UE configuration update procedure.

In some aspects, the indication of the one or more SNPN roaming groups may identify the respective RGIDs associated with each of the one or more SNPN roaming groups. In some aspects, the indication of the one or more SNPN roaming groups may further identify a ranked list of the one or more SNPN roaming groups. In this case, if the UE is capable of accessing a plurality of SNPNs via different SNPN roaming groups (e.g., via different SNPN roaming groups that each include the home SP to which the UE is subscribed), the UE may select and access the SNPN associated with the highest ranked SNPN roaming group or via other rules and/or parameters that are based at least in part on the ranked list of the one or more SNPN roaming groups. The SNPN roaming groups may be ranked or order, in the ranked list (which may be referred to as a separate entity controlled prioritized list), based at least in part on priority (e.g., from highest priority to lowest priority).

As further shown in FIG. 5B, and by reference number 504, to register with an SNPN, the UE may receive a transmission (e.g., a broadcast, a multicast, a group cast, a unicast, and/or the like) from the SNPN (e.g., from a BS 110 included in the SNPN) and may determine whether the transmission identifies an RGID associated with an SNPN roaming group of the one or more SNPN roaming groups. As shown by reference number 506, if the UE determines that the transmission from the SNPN identifies an RGID associated with an SNPN roaming group of the one or more roaming groups, the UE may register with the SNPN.

In some aspects, if the UE receives transmissions from a plurality of SNPNs, and each of the transmissions identifies a respective RGID that is associated with an SNPN roaming group of the one or more SNPN roaming groups, the UE may select the SNPN to register with based at least in part on a ranked list of the one or more SNPN roaming groups. For example, the UE may identify the highest ranked SNPN roaming group, in the ranked list, that was identified in the transmissions from the plurality of SNPNs and may register with the SNPN that transmitted the RGID associated with the highest ranked SNPN roaming group.

In some aspects, the UE may register with the SNPN using one or more of the techniques described above in connection with FIGS. 4A-4C. After registration with the SNPN, the UE may be granted access to communicate with various data networks provided via the SNPN, such as data networks providing non-public network services and/or the like.

In this way, the SNPN roaming group may be used to reduce the complexity and increase the scalability of maintaining lists of supported home SPs for an SNPN (e.g., a V-SNPN). An SNPN may broadcast or transmit an RGID to indicate the plurality of networks, which consumes fewer radio resources than explicitly broadcasting or transmitting the individual identifiers for each of the plurality of networks. Moreover, in this way, the SNPN roaming hub may reduce the processing and memory resource consumption of devices and/or components included in V-SNPNs that would otherwise be consumed to maintain lists of supported home SPs. The SNPN roaming hub may configure an RGID for one or more V-SNPNs, and each V-SNPN may broadcast or transmit the RGID. Moreover, the SNPN roaming hub may offload the burden of keeping lists of supported home SPs up to date by updating the RGID as home SPs are added and/or removed from the SNPN roaming group associated with the RGID.

As indicated above, FIGS. 5A and 5B are provided as one or more examples. Other examples may differ from what is described with respect to FIGS. 5A and 5B.

Figure 6:
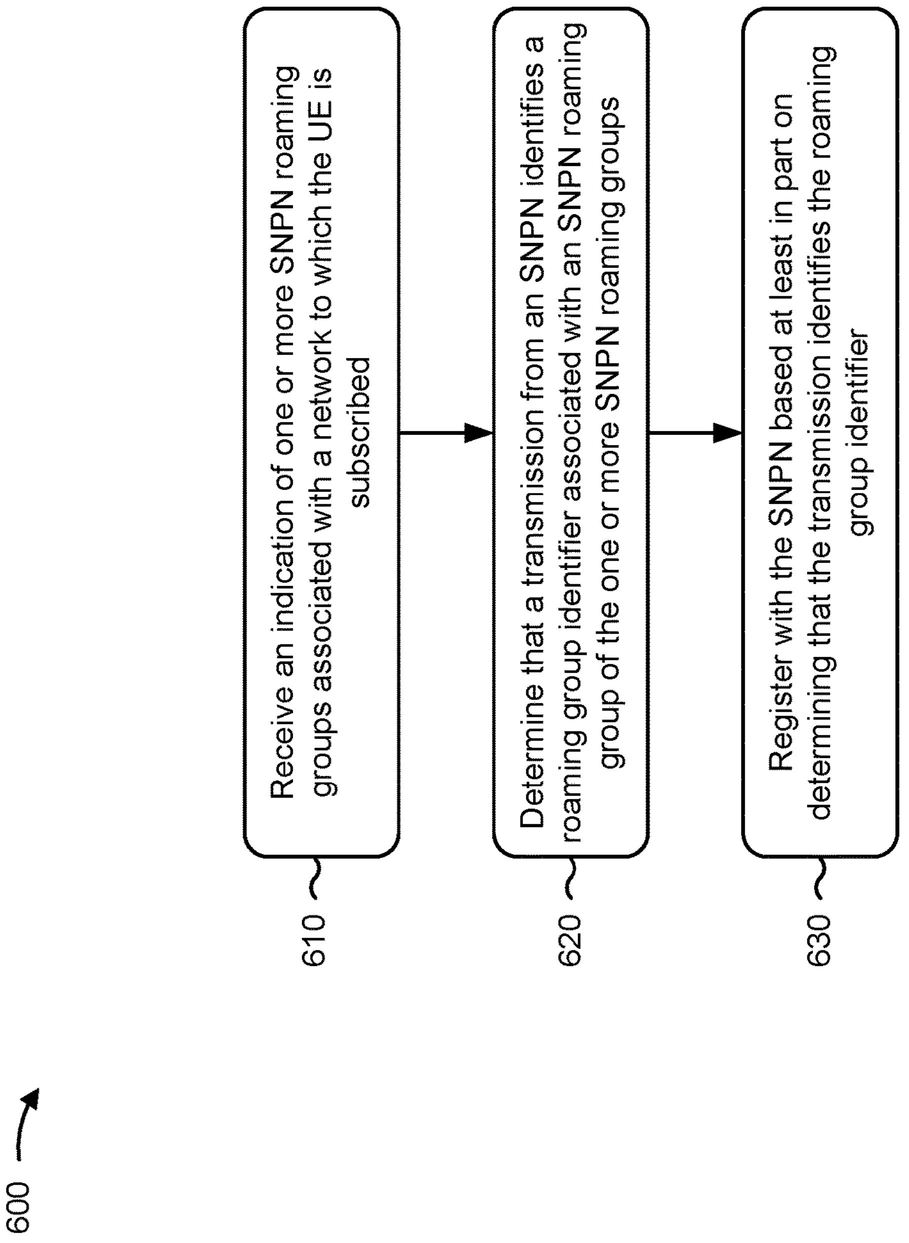
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 illustrated in and/or described in connection with one or more of FIGS. 1-3, 4A-4C, 5A and 5B, and/or the like) performs operations associated with discovery and selection of an SNPN based at least in part on an SNPN roaming group.

As shown in FIG. 6, in some aspects, process 600 may include receiving an indication of one or more SNPN roaming groups associated with a network to which the UE is subscribed (block 610). For example, the UE (e.g., using antenna 252, DEMOD 254, MIMO detector 256, receive processor 258, controller/processor 280, memory 282, and/or the like) may receive an indication of one or more SNPN roaming groups associated with a network to which the UE is subscribed, as described above.

As further shown in FIG. 6, in some aspects, process 600 may include determining that a transmission from an SNPN identifies a roaming group identifier associated with an SNPN roaming group of the one or more SNPN roaming groups (block 620). For example, the UE (e.g., using receive processor 258, transmit processor 264, controller/processor 280, memory 282, and/or the like) may determine that a transmission from an SNPN identifies a roaming group identifier associated with an SNPN roaming group of the one or more SNPN roaming groups, as described above.

As shown in FIG. 6, in some aspects, process 600 may include registering with the SNPN based at least in part on determining that the transmission identifies the roaming group identifier (block 630). For example, the UE (e.g., using receive processor 258, transmit processor 264, controller/processor 280, memory 282, and/or the like) may register with the SNPN based at least in part on determining that the transmission identifies the roaming group identifier, as described above.

Process 600 may include additional aspects, such as any single aspect or any combination of aspects described below and/or in connection with one or more other processes described elsewhere herein.

In a first aspect, the indication of the one or more SNPN roaming groups identifies a respective roaming group identifier associated with each of the one or more SNPN roaming groups. In a second aspect, alone or in combination with the first aspect, receiving the indication of the one or more SNPN roaming groups comprises receiving the indication of the one or more SNPN roaming groups as part of a UE configuration update procedure for the UE.

In a third aspect, alone or in combination with one or more of the first and second aspects, receiving the indication of the one or more SNPN roaming groups comprises receiving the indication of the one or more SNPN roaming groups as part of a subscriber identification module over-the-air update procedure for the UE. In a fourth aspect, alone or in combination with one or more of the first through third aspects, each of the one or more SNPN roaming groups is associated with one or more other networks.

In a fifth aspect, alone or in combination with one or more of the first through fourth aspects, the indication of the one or more SNPN roaming groups comprises a ranked list of the one or more SNPN roaming groups, and registering with the SNPN based at least in part on determining that the transmission identifies the roaming group identifier comprises registering with the SNPN based at least in part on the ranked list of the one or more SNPN roaming groups. In a sixth aspect, alone or in combination with one or more of the first through fifth aspects, the one or more SNPN roaming groups are configured by an SNPN roaming hub. In a seventh aspect, alone or in combination with one or more of the first through sixth aspects, the transmission form the SNPN is a SIB broadcast.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
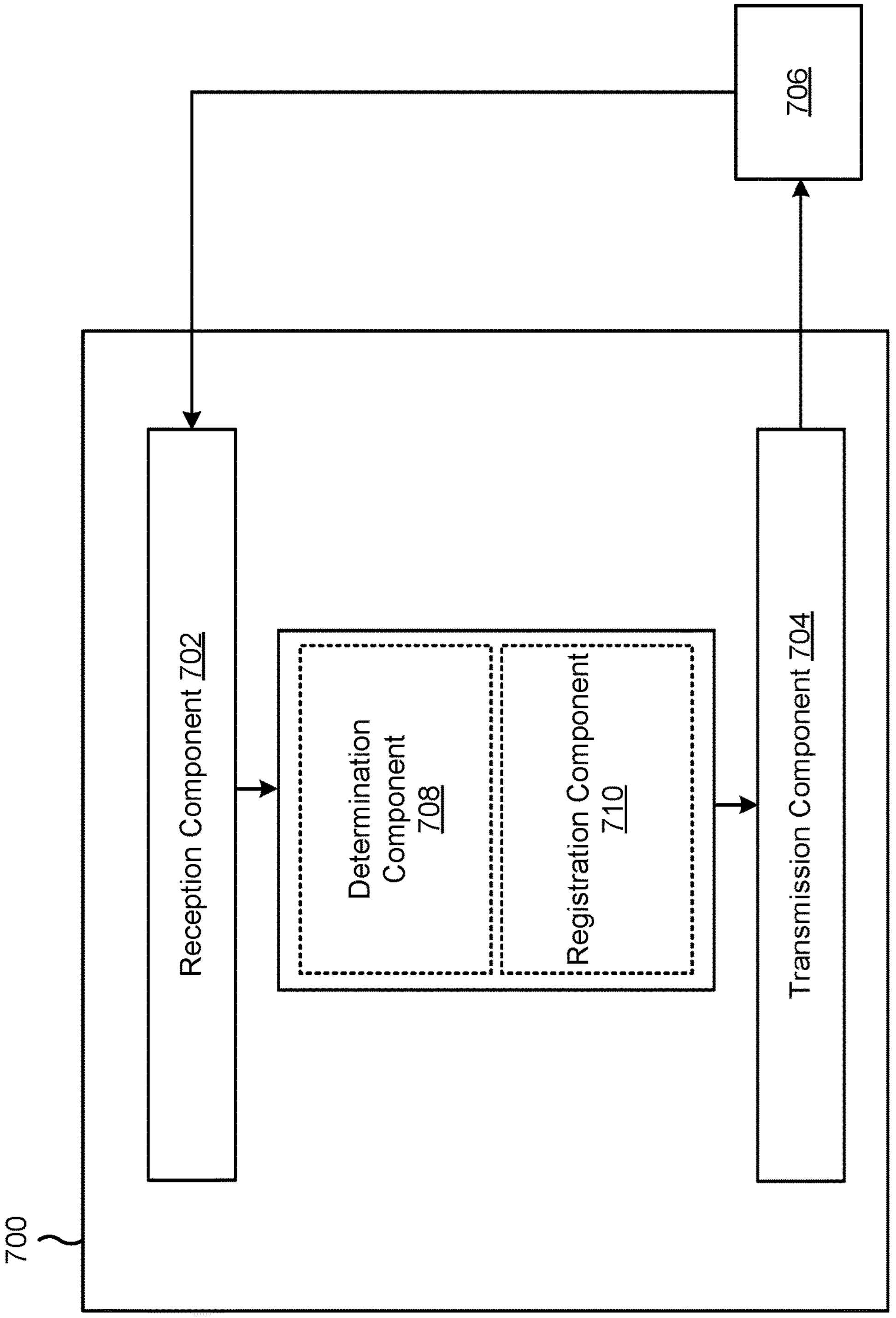
FIG. 7 is a diagram of an example apparatus for wireless communication, in accordance with various aspects of the present disclosure.

FIG. 7 is a diagram of an example apparatus 700 for wireless communication, in accordance with various aspects of the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708 and/or a registration component 710, among other examples.

In some aspects, the apparatus 700 may be configured to perform one or more operations described herein in connection with FIGS. 3, 4A-4C, 5A, and/or 5B. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive (e.g., from the apparatus 706) an indication of one or more SNPN roaming groups associated with a network to which the apparatus 700 is subscribed. The determination component 708 may determine that a transmission from an SNPN identifies a roaming group identifier associated with an SNPN roaming group of the one or more SNPN roaming groups. The registration component 710 may register with the SNPN based at least in part on determining that the transmission identifies the roaming group identifier.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of aspects of the present disclosure:

Aspect 1: A method of wireless communication performed by a user equipment (UE), comprising: receiving an indication of one or more standalone non-public network (SNPN) roaming groups associated with a network to which the UE is subscribed; determining that a transmission from an SNPN identifies a roaming group identifier associated with an SNPN roaming group of the one or more SNPN roaming groups; and registering with the SNPN based at least in part on determining that the transmission identifies the roaming group identifier.

Aspect 2: The method of aspect 1, wherein the indication of the one or more SNPN roaming groups identifies a respective roaming group identifier associated with each of the one or more SNPN roaming groups. Aspect 3: The method of aspect 1 or 2, wherein receiving the indication of the one or more SNPN roaming groups comprises: receiving the indication of the one or more SNPN roaming groups as part of a UE configuration update procedure for the UE.

Aspect 4: The method of any of aspects 1-3, wherein receiving the indication of the one or more SNPN roaming groups comprises: receiving the indication of the one or more SNPN roaming groups as part of a subscriber identification module over-the-air update procedure for the UE. Aspect 5: The method of any of aspects 1-4, wherein each of the one or more SNPN roaming groups is associated with one or more other networks. Aspect 6: The method of any of aspects 1-5, wherein the indication of the one or more SNPN roaming groups comprises: a ranked list of the one or more SNPN roaming groups.

Aspect 7: The method of aspect 6, wherein registering with the SNPN based at least in part on determining that the transmission identifies the roaming group identifier comprises: registering with the SNPN based at least in part on the ranked list of the one or more SNPN roaming groups. Aspect 8: The method of any of aspects 1-7, wherein the transmission from the SNPN is a system information block (SIB) broadcast.

Aspect 9: An apparatus for wireless communication at a device, comprising a processor; memory coupled with the processor; and instructions stored in the memory and executable by the processor to cause the apparatus to perform the method of one or more aspects of aspects 1-8. Aspect 10: A device for wireless communication, comprising a memory and one or more processors coupled to the memory, the memory and the one or more processors configured to perform the method of one or more aspects of aspects 1-8.

Aspect 11: An apparatus for wireless communication, comprising at least one means for performing the method of one or more aspects of aspects 1-8. Aspect 12: A non-transitory computer-readable medium storing code for wireless communication, the code comprising instructions executable by a processor to perform the method of one or more aspects of aspects 1-8. Aspect 13: A non-transitory computer-readable medium storing a set of instructions for wireless communication, the set of instructions comprising one or more instructions that, when executed by one or more processors of a device, cause the device to perform the method of one or more aspects of aspects 1-8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more."

Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

receiving an indication of a plurality of standalone non-public network (SNPN) roaming groups associated with a home service provider (SP) to which the UE is subscribed, wherein the plurality of SNPN roaming groups are ranked in a priority order in a controlled prioritized list;

determining that a transmission from an SNPN identifies a roaming group identifier associated with an SNPN roaming group of the plurality of SNPN roaming groups; and registering with the SNPN based at least in part on determining that the transmission identifies the roaming group identifier.

2. The method of claim 1, wherein the indication of the plurality of SNPN roaming groups identifies a respective roaming group identifier associated with each of the plurality of SNPN roaming groups.

3. The method of claim 1, wherein receiving the indication of the plurality of SNPN roaming groups comprises:

receiving the indication of the plurality of SNPN roaming groups as part of a UE configuration update procedure for the UE.

4. The method of claim 1, wherein receiving the indication of the plurality of SNPN roaming groups comprises:

receiving the indication of the plurality of SNPN roaming groups as part of a subscriber identification module over-the-air update procedure for the UE.

5. The method of claim 1, wherein each of the plurality of SNPN roaming groups is associated with one or more networks.

6. The method of claim 1, wherein the indication of the plurality of SNPN roaming groups comprises:

the controlled prioritized list.

7. The method of claim 6, wherein registering with the SNPN based at least in part on determining that the transmission identifies the roaming group identifier comprises:

registering with the SNPN based at least in part on the controlled prioritized list.

8. The method of claim 1, wherein the transmission from the SNPN is a system information block (SIB) broadcast.

9. A user equipment (UE) for wireless communication, comprising:

one or more memories; and one or more processors operatively coupled to the one or more memories, the one or more memories and the one or more processors configured to:

receive an indication of a plurality of standalone non-public network (SNPN) roaming groups associated with a home service provider (SP) to which the UE is subscribed, wherein the plurality of SNPN roaming groups are ranked in a priority order in a controlled prioritized list;

determine that a transmission from an SNPN identifies a roaming group identifier associated with an SNPN roaming group of the plurality of SNPN roaming groups; and register with the SNPN based at least in part on determining that the transmission identifies the roaming group identifier.

10. The UE of claim 9, wherein the indication of the plurality of SNPN roaming groups identifies a respective roaming group identifier associated with each of the plurality of SNPN roaming groups.

11. The UE of claim 9, wherein the one or more processors, when receiving the indication of the plurality of SNPN roaming groups, are configured to:

receive the indication of the plurality of SNPN roaming groups as part of a UE configuration update procedure for the UE.

12. The UE of claim 9, wherein the one or more processors, when receiving the indication of the plurality of SNPN roaming groups, are configured to:

receive the indication of the plurality of SNPN roaming groups as part of a subscriber identification module over-the-air update procedure for the UE.

13. The UE of claim 9, wherein each of the plurality of SNPN roaming groups is associated with one or more networks.

14. The UE of claim 9, wherein the indication of the plurality of SNPN roaming groups comprises:

the controlled prioritized list.

15. The UE of claim 14, wherein the one or more processors, when registering with the SNPN based at least in part on determining that the transmission identifies the roaming group identifier, are configured to:

register with the SNPN based at least in part on the controlled prioritized list.

16. The UE of claim 9, wherein the transmission from the SNPN is a system information block (SIB) broadcast.

17. A non-transitory computer-readable medium storing one or more instructions for wireless communication, the one or more instructions comprising:

one or more instructions that, when executed by one or more processors of a user equipment (UE), cause the UE to:

receive an indication of a plurality of standalone non-public network (SNPN) roaming groups associated with a home service provider (SP) to which the UE is subscribed, wherein the plurality of SNPN roaming groups are ranked in a priority order in a controlled prioritized list;

determine that a transmission from an SNPN identifies a roaming group identifier associated with an SNPN roaming group of the plurality of SNPN roaming groups; and register with the SNPN based at least in part on determining that the transmission identifies the roaming group identifier.

18. The non-transitory computer-readable medium of claim 17, wherein the indication of the plurality of SNPN roaming groups identifies a respective roaming group identifier associated with each of the plurality of SNPN roaming groups.

19. The non-transitory computer-readable medium of claim 17, wherein the one or more instructions, that cause the UE to receive the indication of the plurality of SNPN roaming groups, cause the UE to:

receive the indication of the plurality of SNPN roaming groups as part of a UE configuration update procedure for the UE.

20. The non-transitory computer-readable medium of claim 17, wherein the one or more instructions, that cause the UE to receive the indication of the plurality of SNPN roaming groups, cause the UE to:

receive the indication of the plurality of SNPN roaming groups as part of a subscriber identification module over-the-air update procedure for the UE.

21. The non-transitory computer-readable medium of claim 17, wherein each of the plurality of SNPN roaming groups is associated with one or more networks.

22. The non-transitory computer-readable medium of claim 17, wherein the indication of the plurality of SNPN roaming groups comprises:

the controlled prioritized list; and wherein the one or more instructions, that cause the UE to register with the SNPN based at least in part on determining that the transmission identifies the roaming group identifier, cause the UE to:

register with the SNPN based at least in part on the controlled prioritized list.

23. The non-transitory computer-readable medium of claim 17, wherein the transmission from the SNPN is a system information block (SIB) broadcast.

24. An apparatus for wireless communication, comprising:

means for receiving an indication of a plurality of standalone non-public network (SNPN) roaming groups associated with a home service provider (SP) to which the apparatus is subscribed, wherein the plurality of SNPN roaming groups are ranked in a priority order in a controlled prioritized list;

means for determining that a transmission from an SNPN identifies a roaming group identifier associated with an SNPN roaming group of the plurality of SNPN roaming groups; and means for registering with the SNPN based at least in part on determining that the transmission identifies the roaming group identifier.

25. The apparatus of claim 24, wherein the indication of the plurality of SNPN roaming groups identifies a respective roaming group identifier associated with each of the plurality of SNPN roaming groups.

26. The apparatus of claim 24, wherein the means for receiving the indication of the plurality of SNPN roaming groups comprises:

means for receiving the indication of the plurality of SNPN roaming groups as part of a UE configuration update procedure for the apparatus.

27. The apparatus of claim 24, wherein the means for receiving the indication of the plurality of SNPN roaming groups comprises:

means for receiving the indication of the plurality of SNPN roaming groups as part of a subscriber identification module over-the-air update procedure for the apparatus.

28. The apparatus of claim 24, wherein each of the plurality of SNPN roaming groups is associated with one or more networks.

29. The apparatus of claim 24, wherein the indication of the plurality of SNPN roaming groups comprises:

the controlled prioritized list; and wherein the means for registering with the SNPN based at least in part on determining that the transmission identifies the roaming group identifier comprises:

means for registering with the SNPN based at least in part on the controlled prioritized list.

* * * * *